(12) United States Patent
Homann et al.

(10) Patent No.: US 6,787,097 B1
(45) Date of Patent: Sep. 7, 2004

(54) MULTIPLE CAVITY GAS ASSISTED PLASTIC INJECTION MOLDING

(75) Inventors: Gregory A. Homann, Canton, MI (US); James Hendry, Brooksville, FL (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/250,281

(22) Filed: Jun. 20, 2003

(51) Int. Cl.[7] .............................................. B29D 22/00
(52) U.S. Cl. ....................................... 264/572; 425/130
(58) Field of Search ........................... 264/572; 425/130

(56) References Cited

U.S. PATENT DOCUMENTS 5,135,703 A * 8/1992 Hunerberg et al. ......... 264/572
5,635,117 A * 6/1997 Fujioka et al. ............. 264/40.1
6,231,805 B1 * 5/2001 Yairo et al. ................. 264/500
6,403,014 B1 * 6/2002 Hendry et al. .............. 264/500

* cited by examiner

Primary Examiner—Suzanne E. McDowell
(74) Attorney, Agent, or Firm—Bill C. Panagos

(57) ABSTRACT

A method and system for multiple-cavity gas-assisted plastic injection molding. Each of the mold cavities are oriented in the vertical direction with the valve gates for the plastic material being positioned at the lower vertical ends of the mold cavities. With four mold cavities, an "X"-shaped runner pattern is utilized, although an "H"-shaped pattern could also be utilized. The centerline of the manifold is offset from the centerline of the mold. Gas is injected through in-article gas pins positioned in the mold cavities. The direction of the melt front advance is vertical from the bottom of the mold cavities to the top of the cavities. The gas pin location is also at the gate end of the part, either at or forward of the gate or resin entry point.

17 Claims, 5 Drawing Sheets

(PROIR ART)

(PROIR ART)

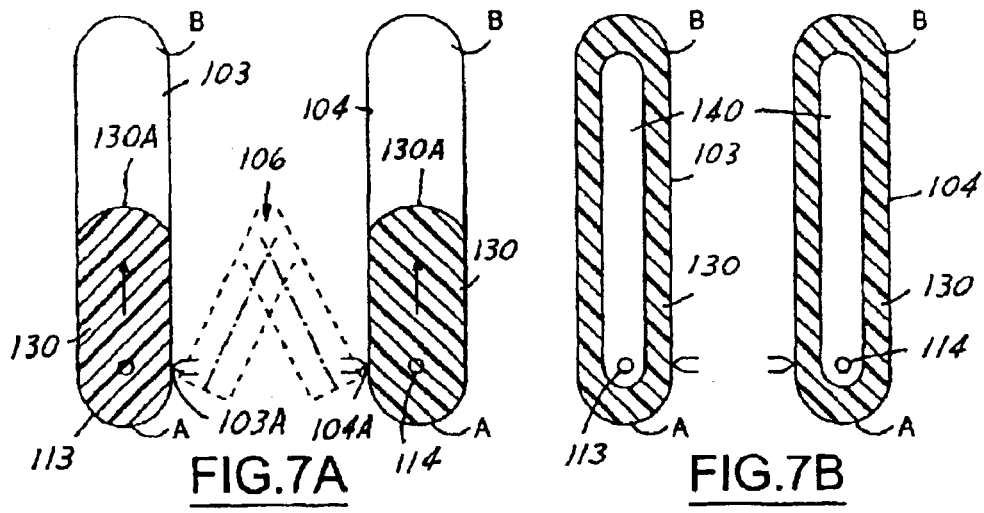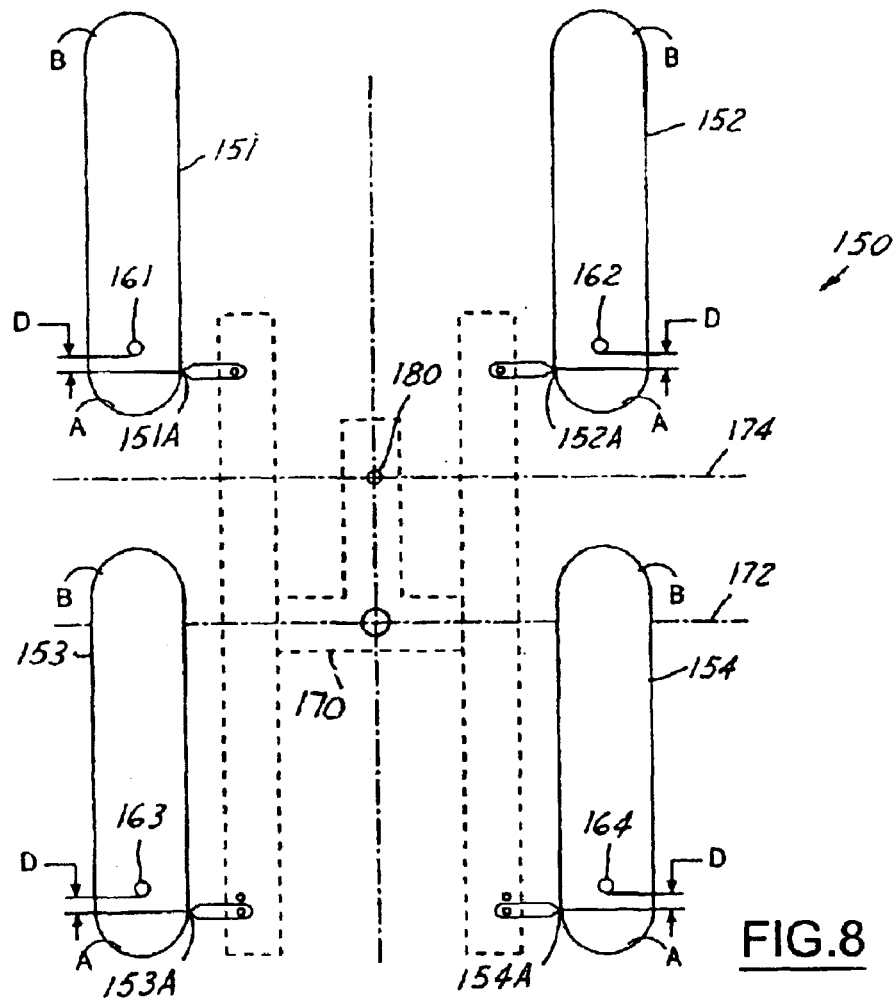

MULTIPLE CAVITY GAS ASSISTED PLASTIC INJECTION MOLDING

BACKGROUND OF INVENTION

The present invention relates to gas-assisted plastic injection molding and more particularly to an improved process and mold design for improved manufacture of hollow articles in a multiple cavity system.

There are numerous processes and systems known today for injection molding plastic articles. In a number of these systems and processes, a pressurized gas, such as nitrogen, is used in conjunction with the injection of the plastic material. The pressurized gas creates hollow interior portions in the molded article which result in savings in weight and material, thereby reducing costs. By reducing the thickness of the walls of the part, the use of pressurized gas also reduces the cycle time to manufacture the articles. The pressurized gas also applies an outward pressure to force the plastic material against the mold surfaces while the articles solidify, providing better surfaces on the molded articles and reducing or eliminating sink marks and other surface defects.

There are numerous problems and concerns with gas-assisted plastic injection molding, just as there are with conventional plastic injection molding. Injection molded articles typically shrink from their cavity size and the stresses in the material caused by the injection molding process often lead to distortion or warpage of the final products. Any nonuniform wall thicknesses in plastic parts made with gas-assisted plastic injection molding also can create stresses in the products which can lead to warping and twisting of the final products as they cool and solidify.

In both conventional plastic injection molding and gas-assisted plastic injection molding, it is common to use multiple cavities in a mold. This increases the number of plastic products that can be molded in each injection cycle, thus reducing cost and increasing productivity and revenue. Multiple cavity systems typically use manifolds, hot runner systems, and the like in order to deliver the plastic material to each of the mold cavities. This can create additional difficulties and concerns in the injection molding processes. Moreover, in multiple cavity gas-assisted plastic injection molding, it is often difficult to create products from each of the mold cavities which are exactly the same. Varying pressures, temperatures, and gas injection characteristics can produce products from a multiple cavity injection molding process which have differently sized and shaped hollow sections thereby creating some parts which have a greater tendency to warp or twist than others.

The above noted problems and molding difficulties are particularly noticeable when the articles being produced are elongated (that is, long and narrow) in shape. With elongated plastic molded articles, it is often difficult to have the gas migrate along the full length of the article or to have walls of uniform thickness. This often results in thicker plastic sections at locations along the length of the elongated article, particularly at one or both of the ends. The uneven thickness lengthens the cooling and product cycle, as well as creates products which have an increased tendency to warp or distort.

There are several quality and production issues that develop as a result of conventional approaches. There are aesthetic issues or surface imperfections that result from a lack of internal melt pressure during the fill of the mold cavity or by the non-uniform advance of the front of the melt in the cavity. Also, as indicated, there are dimensional issues that result from non-uniform residual wall thickness. This is due in part to flow imbalances in the mold cavity, as well as the volumetric requirements due to the flow imbalance. Also, in some conventional systems, there is an inability to vent the gas pressure from the molded article which, among other things, increases the cycle time.

SUMMARY OF INVENTION

It is an object of the present invention to provide an improved method of gas-assisted plastic injection molding. It is another object of the present invention to provide a mold design and process for multiple cavity injection molding of plastic parts using gas-assisted techniques.

It is still another object of the present invention to provide a mold design and process for gas-assisted injection molding which in a multiple cavity system results in production of more uniform products from all the cavities. It is a still further object of the present invention to provide a multiple cavity-assisted plastic injection molding system in which the plastic flows in a balanced manner in all of the mold cavities, and the resultant products have uniform wall thicknesses.

In accordance with the objects of the present invention, a multiple cavity gas-assisted plastic injection mold design and molding process are provided which overcomes problems with conventional multiple cavity mold designs and processes. The present invention has particular use with the molding of elongated hollow plastic products.

In accordance with the invention, the elongated mold cavities are all oriented in the vertical direction with the gate location being at the bottom of each of the mold cavities such that the direction of the melt front advance is vertical from the bottom of the cavity to the top. A valve gated hot runner system is utilized to isolate the gas pressure from the resin distribution system. The gas pin location is also adjacent the gate end of the mold cavity and also located adjacent to or forward of the resin entry point.

A preferred hot runner configuration is an "X" pattern which provides equal flow lengths of the plastic material to each of the valve gates. The sprue from the injection nozzle should be preferably directly in the center of the hot runner manifold. This results in the sprue bushing being offset from the centerline of the mold. This configuration provides optimum uniformity in dynamic flow of the resin to the multiple cavities.

In another embodiment of the invention, an "H-pattern" hot runner member is utilized. This offsets the sprue and allows it to remain at the centerline of the mold. Although this embodiment can result in a flow imbalance, this can be compensated for artificially.

In the inventive process, a short shot of plastic material is injected into each of the cavities in the mold. The molten resin is injected by conventional injection methods into the cavity from the bottom of each of the vertically-oriented mold cavities. The amount of material injected into each of the mold cavities is balanced. When the plastic injection process is completed, the valve gates close in order to isolate each of the cavities. Pressurized gas is then introduced at the gate ends of each of the parts. This displaces the molten resin found in the interior of the parts and completely fills the mold cavities with the resin. Pressurized gas then preferably is provided to pack the molded articles in the mold cavities. Thereafter, once the parts are cooled and solidified, the gas is vented and the pressurized gas from the interior of the molded parts is removed. This reduces the gas pressure in the interiors of the molded parts. Finally, the mold is opened and the parts are ejected.

After the molded parts are removed from the mold cavities, the mold is closed, and the cycle is repeated.

The above objects and other objects, features, and advantages of the present invention are readily apparent from the following detailed description of the preferred embodiments for carrying out the invention when taken in accordance with the accompanying drawings.

BRIEF DESCRIPTION OF DRAWINGS

FIGS. 7A and 7B schematically illustrate the gas-assisted injection molding process in accordance with the present invention.

FIG. 8 illustrates an alternate embodiment of the present invention.

DETAILED DESCRIPTION

Figure 1:
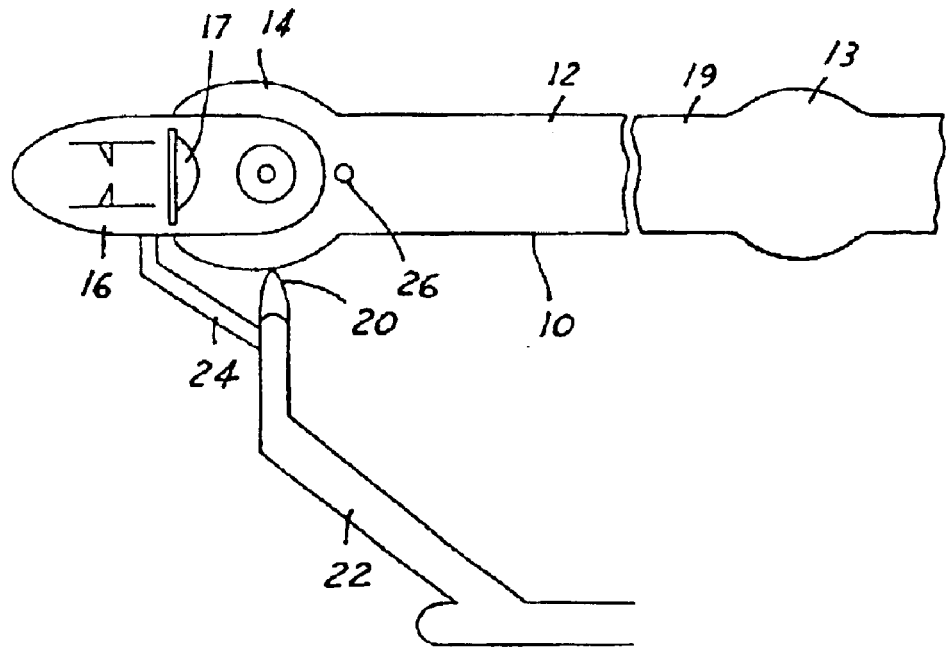
FIG. 1 schematically depicts a conventional mold cavity for making an elongated gas-assisted molded article.
Figure 2:
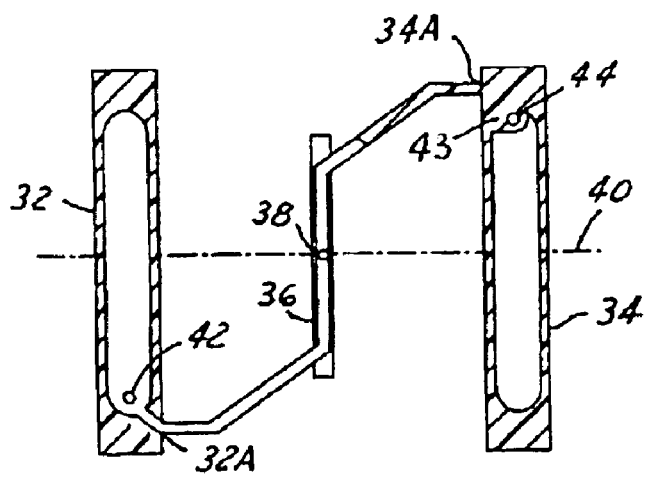
FIG. 2 schematically illustrates a conventional two-cavity system and mold design for gas-assisted injection molding of elongated articles.
Figure 3:
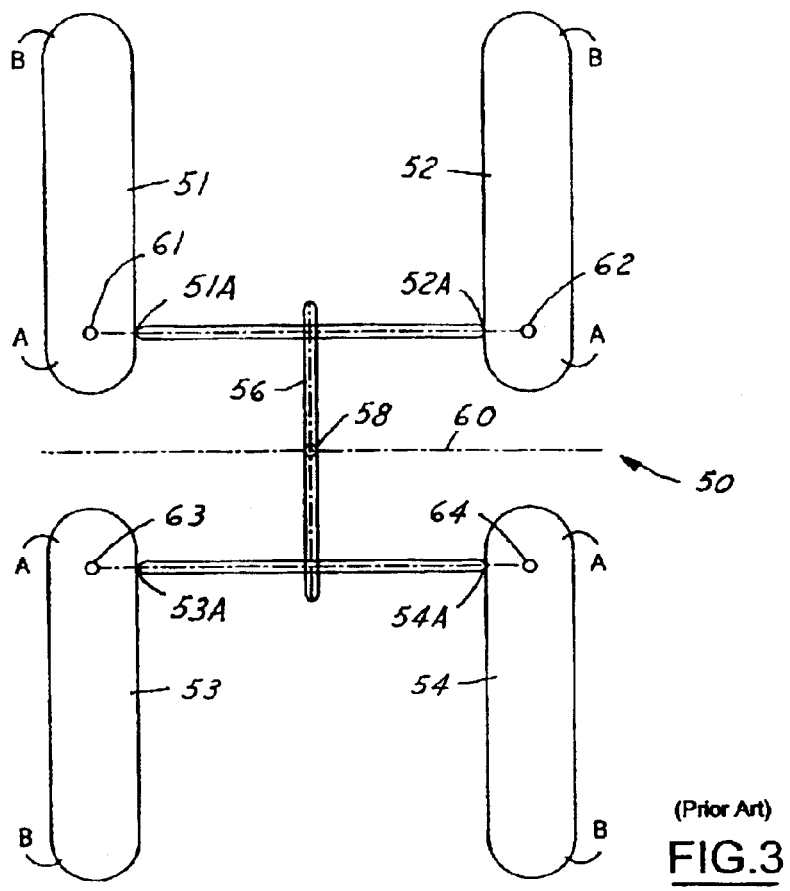
FIG. 3 illustrates a conventional four-cavity mold design and process for producing gas-assisted plastic injection molded elongated articles.

FIGS. 1–3 illustrate conventional single, double and multiple cavity gas-assisted plastic injection molding systems. As shown in FIG. 1, the mold cavity 10 is provided to form an elongated plastic molded article. The cavity 10 is in a two-piece mold (not shown) which is positioned between platen members which are positioned on a conventional injection molding machine. A typical mold has two halves, a core and a cavity, The two halves are connected separately to platens on the injection molding machine and are adapted to be moved relative to one another to open and close the mold cavity. All of these features are conventional and known to persons in the art and no further explanation is believed necessary.

The plastic part which is made from the mold cavity 10 shown in FIG. 1 is a door handle or grip handle preferably for an automobile, appliance, or the like. The part has a central body portion 12 with two ends 13 and 14 and two hinged members 15 and 16. Plastic is introduced into the mold cavity 10 through a gate 20. The plastic material is provided to the gate through a runner 22. For the particular part shown, a flow leader 24 is also provided in order to provide plastic material to the hinge portion 16 of the article. The pressurized gas is introduced into the mold cavity through gas pin 26. The actual orientation of the mold cavity 10 in the mold relative to the mold machine can be horizontal or vertical, dependent on the discretion of the designer.

As plastic material enters the mold cavity 10 from the gate 20 and flow leader 24, it flows the length of the mold cavity toward end 13. In the particular article shown, the molten resin enters through the flow leader and fills the closure 16 and then spills across hinge area 17 and intersects the melt front which enters through gate 20. As the melt front intersects with the flow leader melt, the front moves cooler resin to the end of the melt front at a substantial distance along the length of the cavity 10. Often, a splay defect occurs at area 19 indicated in the mold cavity 10.

Once the short shot of plastic material is injected into the mold cavity, gas is introduced into the melt through the gas pin 26. The pressurized gas forms a hollow section substantially in the center of the plastic article forcing the plastic material to completely fill the mold cavity and form the completed external surface of the molded part. Thereafter, in conventional gas-assisted plastic injection molding systems, the gas pressure is typically increased or held in order to force the plastic material against the walls of the mold cavity until the part solidifies and cools in order to retain its shape. Once this is accomplished, the injected gas pressure is relieved (vented or exhausted) from the hollow portions of the article. This is typically accomplished by venting the gas through the gas pin 26. Thereafter, the mold is opened and the part is ejected from the mold cavity 10. Typically, one or more ejector pins (not shown) are utilized in order to assist in ejecting the part from the mold cavity. Once the cycle is completed, the mold is closed and the cycle is repeated.

FIG. 2 schematically shows a two-cavity gas-assisted plastic injection molding system and process. The system is identified by the reference numeral 30. In this system, two mold cavities 32 and 34 are provided. Plastic is injected into the mold cavities 32 and 34 through a hot runner system 36. Plastic is injected into the hot runner system at point 38, which is located on the centerline 40 of the mold and molding system. Plastic material which is injected into the hot runner system 36 is injected into the mold cavities 32 and 34 through gates 32A and 34A, respectively. The sprue at injection point 38 into the hot runner system is isolated from the injection unit by a shut-off nozzle (not shown).

Pressurized gas is introduced into the mold cavities 32 and 34 through injection pins 42 and 44, respectively.

When the injection molding process is performed utilizing the two-cavity mold design and system as shown in FIG. 2, a short shot of plastic material is first injected through gates 32A and 34A into each of the mold cavities. Once the plastic injection is completed, the shut off nozzle is closed and gas is injected into each of the mold cavities through gas pins 42 and 44.

For conventional two-cavity mold designs, the mold cavities and hot runner systems are balanced and made uniform as shown in FIG. 2. As indicated, the mold cavities 32 and 34 are typically oriented in a vertical direction and the resin distribution system is balanced such that plastic material is introduced into one cavity (in this case cavity 32) at its lower end and into the other cavity (in this case cavity 34) at its upper end.

Using the conventional mold design as shown in FIG. 2, pressure is higher in mold cavity 32 due to the higher volume of resin and/or gas which is injected. This causes the gas to seek the lowest pressure area which in this mold design is cavity 34. As the gas travels to the lower pressure area, it displaces the molten resin from the runner system 36 into cavity 34. The resin enters the cavity 34 through the gate 34A creating an additional mass of plastic material 43 at the upper end of the molded part and often covers the gas pin 44. The displaced plastic material from the runner system covers the gas pin 44 and the vent hole when the pin retracts. This prevents venting or exhausting gas from the part produced in mold cavity 34 in a conventional manner. Instead, the molding cycle time can be increased in order to allow the gas pressure to dissipate naturally before the mold can be opened and the parts ejected. Not only does this provide two plastic parts which are not uniform in their weights or wall thicknesses, but increases the cycle time and reduces the efficiency of the process. Also, the molded part which has a larger mass of plastic at one end has a greater tendency to warp or distort when the part is removed from the mold.

FIG. 3 illustrates a conventional multi-cavity mold design and system 50. In this design, four elongated mold cavities 51, 52, 53, and 54 are provided. The four cavities are all connected to a common resin distribution system 56 which can be a cold or hot runner system. A conventional cold sprue is provided in the geometrical center 58 of the hot runner system, which is at the centerline 60 of the mold. The molten plastic material from the injection molding machine (not shown) is injected into the four mold cavities at gates 51A, 52A, 53A, and 54A, respectively. Gas is introduced into the four mold cavities through gas pins 61, 62, 63 and 64, respectively.

In system 50, the molten resin is conveyed to the cavity through the resin distribution system consisting of the sprue 58, runner system 56, and gates 51A–54A. The front of the molten resin advances from the mold gates to the opposite ends of the mold cavity. After the short shot or partial volume of resin is injected into the four mold cavities, pressurized gas is introduced through the gas pins 61–64. The gas displaces the molten resin in the interior and forces the molten plastic completely fill the mold cavities. This defines the article geometry in each of the four cavities.

Figure 4A:
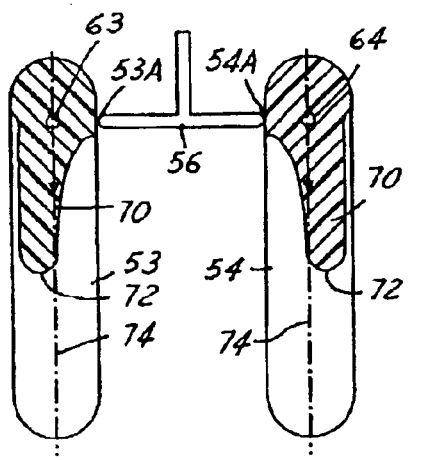
FIGS. 4A and 4B illustrate steps in conventional gas-assisted plastic injection molding of elongated articles.
Figure 4B:
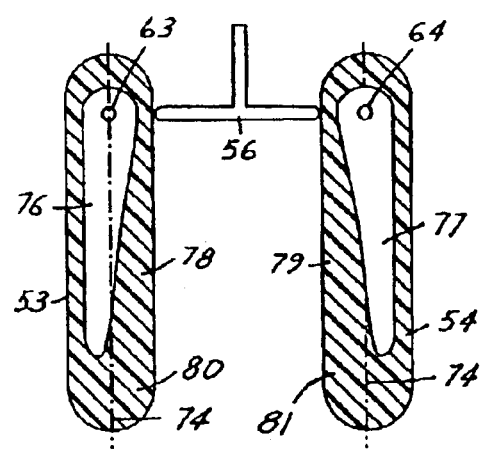

As shown in FIG. 3, conventional mold designs which maintain a uniformity and balance in the system and inject the plastic material at the centerline of the mold, create a situation where the plastic material is introduced at the upper ends of two of the mold cavities (cavities 53 and 54) and at the lower ends of the other two mold cavities (cavities 51 and 52). This results in the formation of molded plastic articles which are often dissimilar, have different areas of wall thicknesses, and have different warpage and distortion attributes when the parts are finally ejected from the mold cavities. In this regard, FIGS. 4A and 4B schematically illustrate the formation and production of two of the parts from the multi-cavity molding system 50. As shown in FIG. 4A, when the plastic material 70 is first introduced into each of the mold cavities 53 and 54, the melt front 72 is not uniform or consistent. Instead, the plastic material droops as shown, and also is often positioned off-center from the centerline 74 along the side opposite the gates 53A and 54A.

As a result, when the gas is injected into the mold cavities 53 and 54, the resulting hollowed out spaces 76 and 77 are not centered in the product resulting in uneven wall thicknesses of the product. This is shown in FIG. 4B. The hollow portions 76 and 77 are offset from the centerlines 74 creating larger areas of plastic material 78 and 79 along the sides of the molded products as well as larger and thicker end members 80 and 81 at the distal ends of the mold cavities.

Figure 5A:
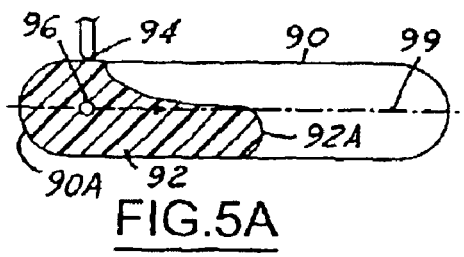
FIGS. 5A and 5B illustrate an alternate conventional gas-assisted plastic injection molding of elongated plastic articles.
Figure 5B:
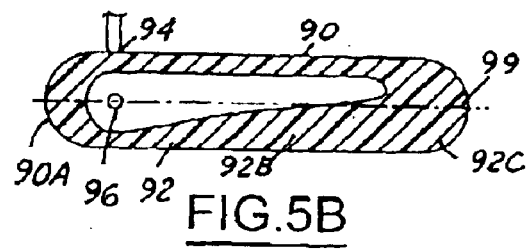

The off-center hollow chambers formed by the injected gas and the resultant differences in thicknesses of the wall portions of the molded product also appear in mold cavities which are oriented horizontally. This is shown in FIGS. 5A and 5B. Plastic material 92 is injected into the mold cavity 90 through inlet gate 94. In this regard, the same situation exists in horizontally oriented mold cavities regardless of whether the gate 94 is on the top, end or bottom of the end 90A of the mold cavity. In FIGS. 5A and 5B, the gate 94 is merely positioned on the top of the end 90 for illustrative purposes.

As the plastic material 92 is injected into the mold cavity 90, the melt front 92A is formed by gravity into the configuration shown in FIG. 5A. As shown, the melt front is not uniform across the cross-sectional area of the mold cavity 90.

Injected gas is introduced into the mold cavity 90 and the plastic material 92 through gas pin 96. As shown in FIG. 5B, the gas chamber 98 formed inside the plastic material as it completely fills the mold cavity is offset from the centerline 99. This forms thicker wall section 92B along the central areas of the final product, as well as a thicker end portion 92C. Again, as pointed out above, the thicker portions 92B and 92C create longer cycle times for the molding process and also increase the chances of distortion or warpage of the molded product once it is ejected from the mold cavity.

Figure 6:
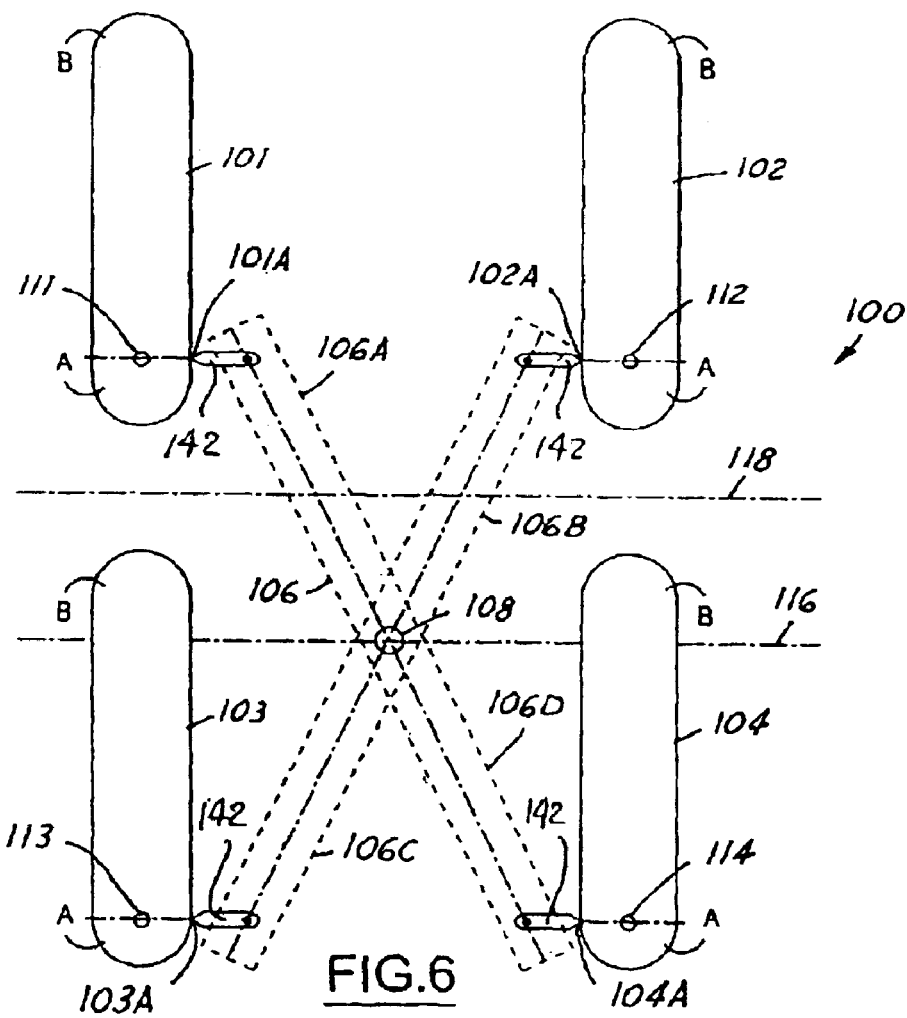
FIG. 6 illustrates a preferred embodiment of the present invention.

A multi-cavity gas assisted plastic injection molding system in accordance with the present invention is shown in FIG. 6. The system is designated generally by the reference numeral 100. In the multiple cavity system shown, four mold cavities, 101, 102, 103 and 104 are illustrated. It is to be understood, of course, that other numbers of cavities could be utilized in a multi-cavity system in accordance with the present invention and still realize its benefits and advantages.

In the system 100, each of the mold cavities 101–104 are oriented vertically with lower ends "A" positioned vertically below upper ends "B". The gas is ejected through gates 101A, 102A, 103A and 104A at the lower ends "A" of each of the mold cavities. In order to accomplish this, a manifold runner system 106 is utilized. Preferably, the runner system 106 has a "X"-shaped orientation as shown in FIG. 6 with equal length runner members 106A, 106B, 106C and 106D.

The plastic material is injected through sprue 108, which is in the center of the "X" arrangement. In this manner, the plastic material travels the same distance from the introduction point 108 into the runner system to the mold cavities 101–104.

Each of the gates 101A–104A have shut off valves of some type, such as hot tip bushings, which control the flow of the plastic material into mold cavities.

As shown in FIG. 6, the center line 116 of the manifold is offset from the centerline of the mold 118. This arrangement could create some difficulties in uneven mold pressures during the molding process, but should be overcome by persons of ordinary skill in the art.

The gas which is injected into the plastic material in the mold cavities is injected through gas pins 111, 112, 113, and 114 into the four mold cavities, 101, 102, 103, and 104, respectively.

As shown in FIG. 6, the location of each of the gas pins 111–114 is directly in line with the valve gates 101A–104A in which the plastic is injected into the mold cavities. In accordance with the present invention, preferably the location of the gas pins are either at that position or at a position farther away from ends "A" of the mold cavity and in the direction of the ends "B" of the mold cavities. In other words, the gas pin location is at the gate end of the part preferably either at the gate location or forward of the gate or resin entry port. The gas pin location also preferably is in the vertical center of the mold cavity. As indicated, the preferred resin distribution (hot runner) configuration is "X" pattern with equal flow lengths to all valve gates. Additionally, sprue 108 should be directly in the center of the hot runner manifold 106 which result in the sprue bushing being offset from the centerline of the mold. This configuration provides the most uniformity and dynamic flow of the resin into the mold cavities 101–104.

The amount of plastic material injected into each of the mold cavities also should be balanced so that each cavity has the same weight and amount of plastic material. If one or more of the cavities has more resin than the others (i.e. an overfill situation), then the material could pack out and cause warpage or distortion in the molded product. If one or more of the cavities has less resin than the others (i.e. an underfill situation), then the material would be more subject to sheer and degradation, and the material would be more likely to have the injected gas cause a "blow out" through the material. Preferably, the weight of the plastic in each of the cavities should not differ more than 1%.

In order to balance the amount of plastic material injected into each of the mold cavities, gate blocks 142 can be installed in each of the runners (106A–106D). The gate blocks can be manually adjusted and act as throttles or restriction members in the plastic material passageways.

With the mold cavities oriented in the vertical direction, the flow of the plastic material in the mold is more uniform, and the molded parts have substantially the same wall thicknesses throughout. This is shown in FIGS. 7A and 7B. In FIGS. 7A–7B, mold cavities 103 and 104 are shown for illustrative purposes.

The plastic material 130 which is injected into the mold cavities 103 and 104 proceeds vertically upwardly from ends "A" to ends "B" of the cavities. The melt fronts 130A are relative uniform across the mold cavities as shown in FIG. 7A. Once the molten resin is injected by conventional means into the cavities to a volume less than the full volume of the melt cavities (that is, a short shot of plastic material is injected), gas is injected under pressure through gas pins 113 and 114. The pressurized gas is forced through the plastic material to the upper ends "B" of the mold cavities forming hollow plastic parts. As shown in FIG. 7B, the gas forms hollow portions 140 approximately in the center of the plastic material 130. Also as shown in FIG. 7B, the walls of the plastic parts, which are formed by the inventive molding process, have substantially uniform wall thicknesses throughout their lengths and the extent of the molded articles, including the upper and lower ends. Also, the gas pins 113 and 114 are positioned in the hollow portions 140 in order to allow satisfactory venting or exhausting of the gas from the molded part.

With the present invention, the cycle times of the molding process can be reduced over 50 percent from conventional multi-cavity gas assisted plastic injection molding processes. The present invention also can improve the quality and consistency of the molding process.

The same results can be accomplished using other patterns of hot runner configurations, such as the "H"-pattern as shown in FIG. 8. The system shown in FIG. 8 is referred to generally by the reference numeral 150. The multi-cavity system 150 has four mold cavities 151, 152, 153, and 154 which are oriented vertically in the same manner and for the same reasons as the mold cavities 101–104 referred to above with respect to system 100.

Plastic material is introduced into mold cavities 151–154 through valve gates 151A, 152A, 153A and 154A respectively. Gas is introduced into the mold cavities through gas pins 161, 162, 163, and 164. Also, as shown in FIG. 8, the gas pins 161–164 are offset a distance "D" toward the ends "B" from the position of the valve gates 151A–154A.

The hot runner manifold 170 has an "H"-shaped pattern as shown. The centerline 172 of the manifold 170 is offset from the centerline 174 of the mold. The plastic is injected into the runner system 170 at point 180.

The molding process for the H-shaped mold system 150 is basically the same as that described above with respect to system 100. Although the H-shaped manifold configuration can result in some flow imbalances relative to the X-shaped manifold configuration of system 100, the imbalances can be artificially compensated for in conventional manners known in the art.

Figure 9:
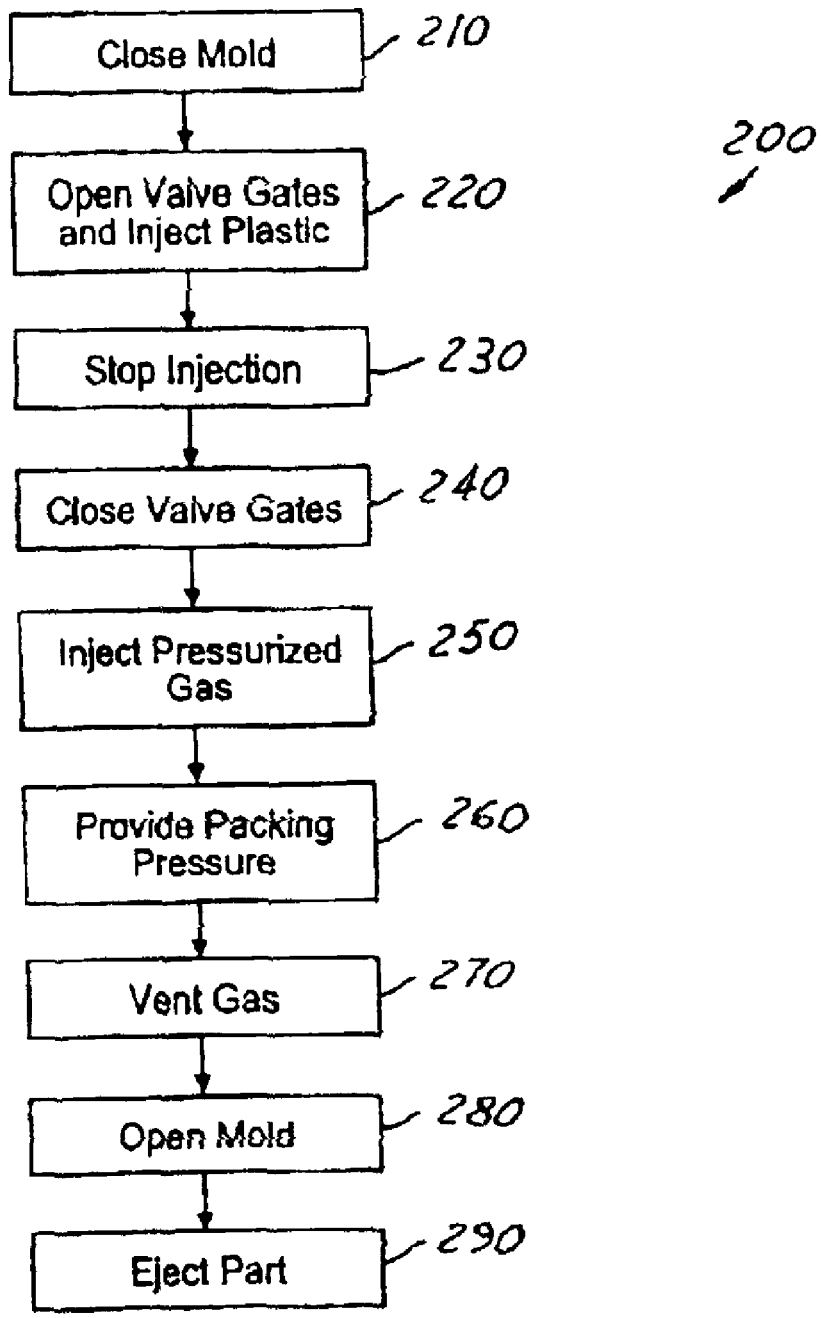
FIG. 9 is a flow diagram illustrating the basic steps in an embodiment of the present invention.

The sequence of processing steps in accordance with the use of systems described above which use the present invention is shown in FIG. 9. The process is indicated generally by the reference numeral 200. As a first Step 210, the mold is closed. Thereafter, the valve gates are opened and plastic is injected into the mold cavities. This is shown in Step 220.

Once the short shot of plastic material is injected into the mold cavities, the plastic injection is stopped. This is shown in Step 230. The valve gates are then closed, as shown in Step 240, and the pressurized gas is injected into the plastic material. This is step 250. The valve gates are closed in order to isolate the mold cavities and not allow the pressurized gas to force any of the plastic material back into the manifold or runner system. The pressurized gas is introduced at the gate ends of the parts and displaces the molten resin to completely fill the mold cavities.

Thereafter, as shown in Step 260, pressurized gas is applied to provide packing pressure for the molded article. This is used to hold the plastic material tightly against the cool walls of the mold cavities and provide faster cooling of the plastic parts, as well as provide better surface definition on the surfaces of the parts. In this regard, although the use of packing pressure for these purposes is preferred, it is not required in accordance with the present invention under all circumstances.

Once the parts in the mold cavities have sufficiently solidified, the gas vented as shown in Step 270. Thereafter, the mold is opened 280 and the parts are ejected from the mold cavities. These last two steps are shown in Steps 280 and 290, respectively.

Once the process 200 is completed, the mold is closed and the process is repeated over and over again by the injection molding process and machine.

The layout of the cavity orientation for multi-cavity short-shot gas-assisted plastic injection molding applications in accordance with the present invention cannot be done in the same way as conventional molding application. Previously, molds for in-article gas-assisted applications have been designed using a single cavity prototype mold. A single cavity prototype mold is built using a cold sprue and runner system which is conventionally dated. This is generally shown in FIG. 1. The gate and runner geometry are optimized for the part and the process is proven out. Thereafter, moldable cavities are typically built using the same general dating scheme with a branch cold runner system with conventional cavity orientation. This is shown in FIG. 3. As indicated above, numerous quality and production issues can develop as a result of the conventional approach. Aesthetic issues or surface imperfections can result from a lack of internal cavity pressure during fill, or from a non-uniform melt front advance. Dimensional issues also result from non-uniform residual wall thicknesses due to the flow imbalances and the volumetric requirements that result also due to the flow imbalances.

Additionally, the gas migration through the cold runner system may result in an inability for the gas pressure to vent from the molded article, as shown and described above with reference to FIG. 2.

The term "gas" used herein means any gas body gaseous during normal temperatures and pressures, such as nitrogen, carbon dioxide, and air. Preferably, the gas is an inert material, such as nitrogen or carbon dioxide. The gas can be provided from any conventional source, such as a storage tank, bottled gas, or the like. It is also possible in accordance with the present invention to utilize another fluid, such as water, in place of the gas. All of these gas, water, and other fluid systems are known in the art and do not need to be discussed in more detail here.

Also, it is not believed necessary to disclose or discuss the particular types and sizes of plastic injection molding machines that can be utilized with the present invention since they are commonly and conventionally known in the art. It is also not believed necessary to discuss specific pressures of plastic and gas injection since the specific pressures (as well as temperatures and the like) are dependent upon the plastic materials that are utilized, the sizes of the parts, etc., all of which are within the skill of persons of ordinary skill in the art.

The present invention can be used with all types of plastic materials, particularly thermoplastic materials, which generally may be injection molded. These materials can be, for example, low or high density polyethylene, polyurethane, polypropylene, polystyrene, acrylonitrile butadiene styrene (ABS) resin, SAN resin, polyvinyl chloride, polymethyl methacrylate, and the like. Materials such as polycarbonate, polyester, acetyl, polyacetyl and nylon also may be used, as well as ethylene copolymers such as ethylene-vinyl acetate copolymer, ethylene-ethyl acrylate copolymer, and the like. Furthermore, any of these resins may contain fillers, such as glass fiber, powdered glass, calcium carbonate, calcium sulfate, talc, mica, and the like.

The gas is injected into the resin in the mold at a pressure higher than the plastic injection pressure and typically at a much higher pressure. For example, the initial plastic injection fill pressure could be 200–400 psi, while the packing pressure could be 500–1000 psi or much higher. The gas injection can be 1000–1500 psi (if, for example, the plastic material was polypropylene, and 3000–7000 psi (if, for example, engineering grade resins were used).

In general, the pressure of the gas should be sufficient to provide a commercially acceptable surface end finish on the plastic part. When the plastic is packed in the mold cavity, the pressure is raised several times over the initial injection pressure.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

What is claimed is:

1. A multiple-cavity fluid assisted plastic injection molding system comprising:
   a mold having a plurality of part cavities, each of the cavities having a longitudinal axis oriented in the vertical direction, and having an upper vertical end and a lower vertical end;
   valve gate members positioned at the lower vertical ends of each of the plurality of part cavities, the valve members adapted to inject molten plastic material into each of the part cavities; and
   pin members in each of the part cavities, the pin members being positioned in the lower vertical ends of the part cavities and adapted to inject a fluid under pressure into the part cavities.

2. The multiple-cavity fluid-assisted plastic injection molding system as described in claim 1 wherein said fluid is a gas.

3. The multiple-cavity fluid-assisted plastic injection molding system as described in claim 2 wherein said gas is a nitrogen.

4. The multiple-cavity fluid-assisted plastic injection molding system as described in claim 1 wherein said pin members are positioned at the same position vertically in the part cavities as the valve gate members and where the plastic material is injected into the part cavities.

5. The multiple-cavity fluid-assisted plastic injection molding system as described in claim 1 wherein said pin members are positioned at a vertical distance from the valve gate members and in a direction toward the upper vertical ends of the part cavities.

6. The multiple-cavity fluid-assisted plastic injection molding system as described in claim 1 further comprising a plastic distribution member positioned adjacent said mold and adapted to provide the plastic material for injection substantially simultaneously through the valve gate members and into the part cavities.

7. The multiple-cavity fluid-assisted plastic injection molding system as described in claim 6 wherein said mold has a first centerline and said plastic distribution member has a second centerline, and said first and second centerlines are vertically offset from one another.

8. The multiple-cavity fluid-assisted plastic injection molding system as described in claim 6 wherein said plastic distribution member comprises an X-shaped hot runner manifold.

9. The multiple-cavity fluid-assisted plastic injection molding system as described in claim 6 wherein said plastic distribution member comprises an H-shaped hot runner manifold.

10. A process for fluid-assisted plastic injection molding comprising the steps of:

providing a multiple-cavity mold member, each of the cavities having a longitudinal axis oriented in the vertical direction and having an upper vertical end and a lower vertical end, closing said mold member;

injecting molten plastic material through a plastic distribution member into each of said cavities, said plastic injection taking place through valve gate members positioned at the lower vertical ends of each of said cavities;

injecting a pressurized fluid into the plastic material in each of said cavities to fill out said cavities with said plastic material and form hollow fluid-filled chambers within said plastic material, said fluid injection taking place through pin members positioned in each of said cavities;

venting said fluid from said cavities;

opening said mold member; and ejecting a completed plastic part from each of said cavities.

11. The process as described in claim 10 wherein said fluid is a gas.

12. The process as described in claim 11 wherein said gas is a nitrogen.

13. The process as described in claim 10 wherein said pin members are positioned at said lower vertical ends of said cavities and adjacent said valve gate members.

14. The process as described in claim 10 wherein said pin members are positioned at a vertical distance from said valve gate members in a direction toward said upper vertical ends of said cavities.

15. The process as described in claim 10 wherein said mold has a centerline and said plastic distribution member is offset from said centerline of said mold.

16. The process as described in claim 10 wherein said plastic distribution member comprises an X-shaped hot runner manifold.

17. The process as described in claim 10 wherein said plastic member comprises an H-shaped hot runner manifold.

* * * * *